Jan. 29, 1935.  C. L. ORR  1,989,333
SAFETY SUPPORT FOR END BRAKE BEAMS
Filed April 19, 1930  2 Sheets-Sheet 2
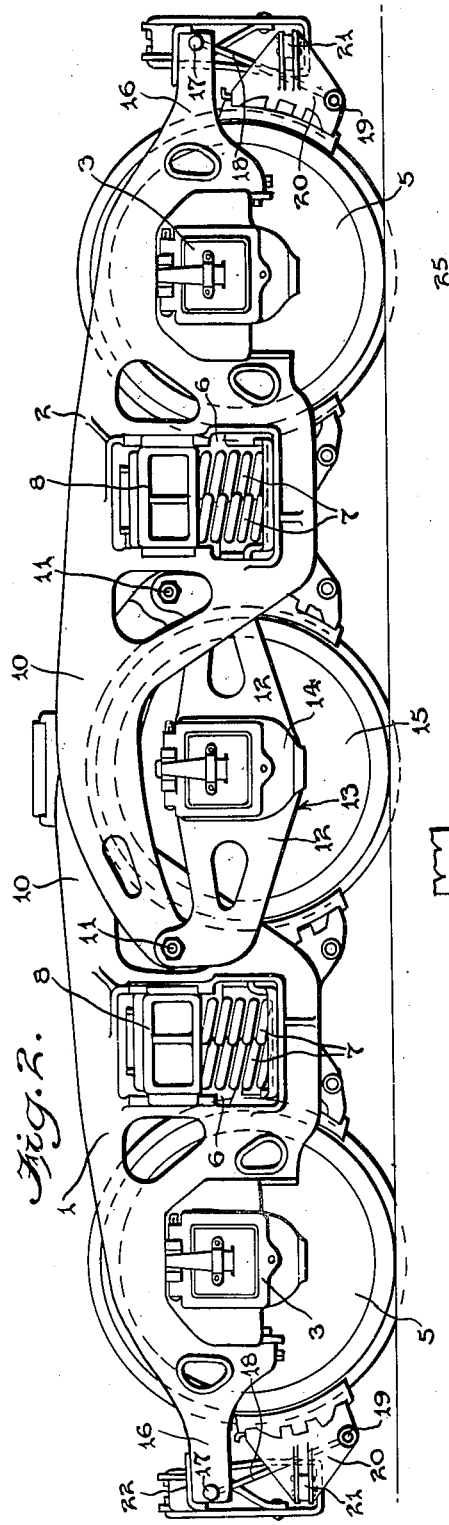
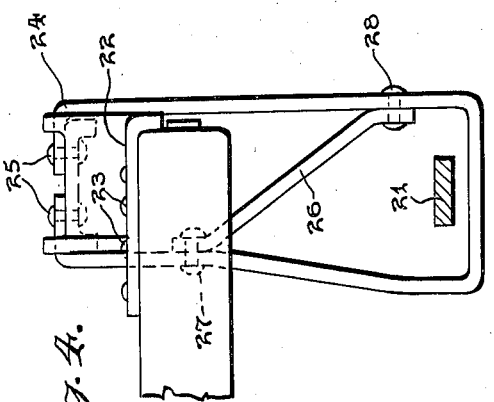
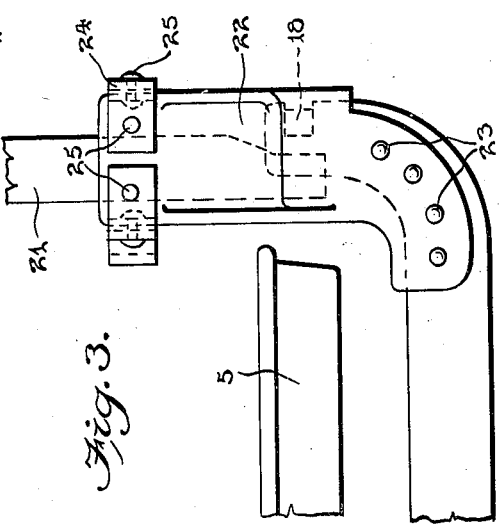
Inventor
C. L. Orr,
By Seymour & Bright
Attorneys Patented Jan. 29, 1935

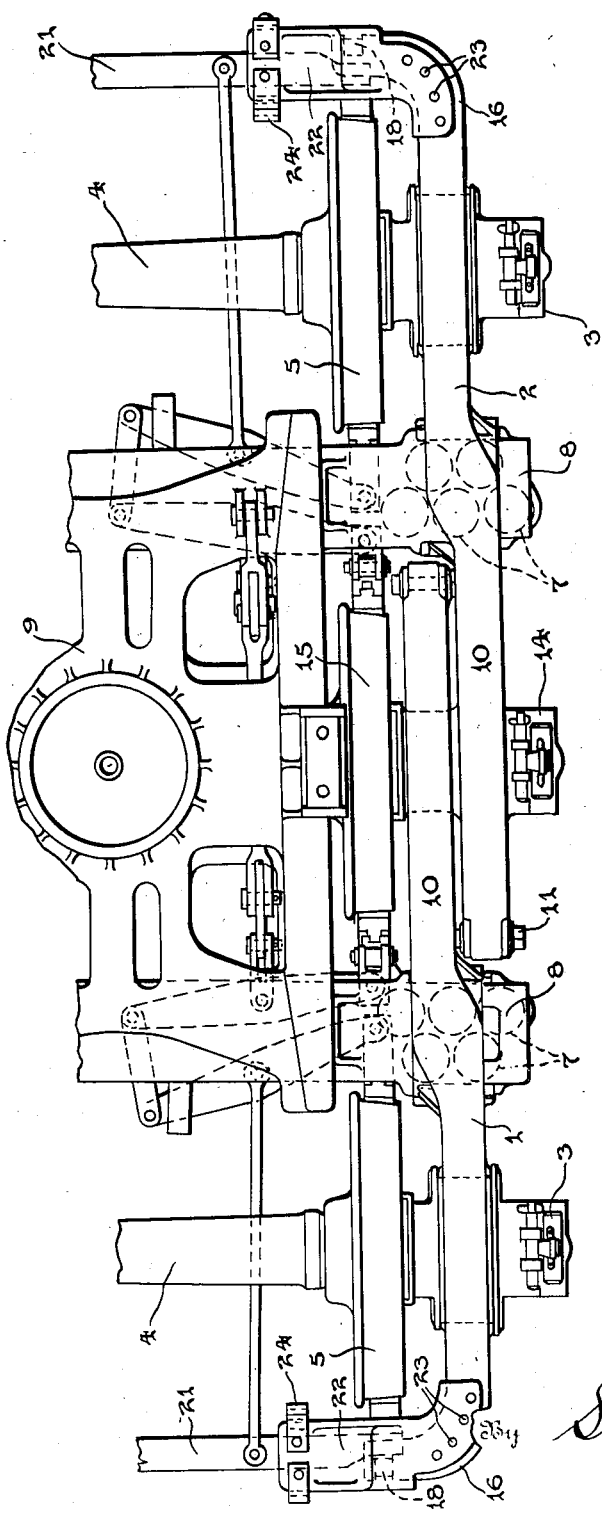

1,989,333

UNITED STATES PATENT OFFICE 1,989,333

SAFETY SUPPORT FOR END BRAKE BEAMS

Claude L. Orr, Columbus, Ohio, assignor to The Buckeye Steel Castings Company, Columbus, Ohio Application April 19, 1930, Serial No. 445,710

1 Claim. (Cl. 188—210)

This invention relates to improvements in brake beam safety supports for use with car trucks, and more especially to novel means for supporting the brake beams at the ends of a truck employing "clasp" type brakes.

"Clasp" brakes (two brake shoes per wheel), are commonly used for high capacity cars and locomotive tenders employing six-wheel trucks, and in addition to the intermediate brake beams, there are usually brake beams at each end of the truck called "end brake beams" which space the brake heads and shoes, and are positioned transversely to the tracks.

These end brake beams are ordinarily secured to the brake heads, which in turn are hung from the end brake hanger brackets by means of brake hangers. When no other means of support, in addition to the brake hanger is provided for the end brake beam, the failure of a brake hanger will allow the beam to drop to the track, and if the beam is on the front end of the truck, the possibility of its getting under the wheels and derailing the truck, is considerable.

The danger of a brake beam dropping to the track and causing derailment, is, of course, not restricted to any particular beams of a truck. Intermediate beams are just as likely to cause trouble as the end beams. However, there is usually no difficulty in taking care of the intermediate beams, as it is only necessary to fasten to the bolster systems, suitable straps or carriers which function as safety supports in case of a broken brake beam hanger. On the other hand, generally there is very little truck construction fore and aft of the wheels of a four-wheel truck, or fore and aft of the end pairs of wheels of a six-wheel truck, to which safety supports for the end beams can be attached.

One of the salient objects of the present invention is to provide safety supports for the end brake beams, which may be secured to the ends of the side frame of the truck.

Another object is to provide the ends of a truck side frame with extension brackets which may project inwardly beyond the inner surfaces of the wheels and carry suitable safety supports for the end brake beams in such position that they will not interfere with the arrangement or movement of the usual brake supports or operating mechanism.

With the foregoing objects outlined and with other objects in view which will appear as the description proceeds, the invention consists in the novel features hereinafter described in detail, illustrated in the accompanying drawings, and more particularly pointed out in the appended claim.

Referring to the drawings,

Fig. 1 is a top plan view of a portion of one form of a six-wheel truck, to which the invention is applied.

Fig. 2 is a side elevation of the same.

Fig. 3 is an enlarged plan view of a portion of the truck and the improved safety support with certain parts omitted to facilitate disclosure of the invention.

Fig. 4 is a side elevation of the same.

While the invention will be disclosed in connection with a six-wheel truck, it is to be understood that it may also be used with four-wheel trucks.

In the drawings, 1 and 2 are the end members of the side frame, each of which is constructed to be attached to a journal box 3, for the end axles 4 on which the end wheels 5 are mounted.

Each end member is provided with a bolster opening 6 in which the springs 7 are arranged that support the cross or transverse bolsters 8, on which the main or longitudinal bolster 9 is mounted.

The end members 1 and 2 have arms 10 which project toward one another and overlap, as best shown in Fig. 1, and the ends of these arms are pivotally connected at 11 to the oppositely extending arms 12 of a central equalizing member 13 which is provided with a journal box 14 for the axle of the central wheels 15.

It is essential in a truck of this character, to distribute the load as nearly as possible equally upon the several journals, and to do this, it is necessary that the distance from the center line of the springs 7 carrying the bolsters 8, to the bearing ends or pivot points 11 of each end member 1 and 2, be twice as long as the distance from the center line of the springs to the center of the axle box 3. With such construction, it will be seen that, with the end arms 10 of the end members 1 and 2 so proportioned, the longer arms which bear on the central member 13, will impart to the axle of the latter, half as much of the load as will be borne by each end axle. In other words, each end axle will bear two-thirds of the load falling on the side frame member to which it is connected, and each end member will transmit one-third of the load on to the axle of the center member.

Of course, the end members 1 and 2 are free to turn or rock on the end journals 3, and the central member 13 is free to rock on the central journal 14, and the pivotal connections between the end members and center member are such that each follows the movement of the other, so that the members of each side frame of the truck are free to move in a vertical plane within reasonable limits, without placing any undue stresses on each other, and without disturbing the proper relations of the parts or impairing the utility of the structure.

In accordance with my invention, each of the end members has a short arm 16 which extends inwardly, as shown in Fig. 1, so that its end is in alignment with the plane of the wheel, and to this end, is pivotally connected, as shown at 17, the usual end brake hanger 18. This suspended hanger is pivotally connected at 19 to a brake head 20, and corresponding heads at the opposite sides of the truck are joined by the conventional end brake beam 21, which is actuated by suitable operating mechanism that need not be described as it forms no part of the present invention.

For the purpose of providing safety supports for the end brake beams in case of breakage of a hanger 18 without changing the arrangement of any of the parts of the truck, I equip each of the arms 16 with an inwardly extending horizontal bracket 22, secured to the arms by any suitable means, such as rivets 23, and provided at its inner end with a stirrup 24, formed by a rigid metal strap of suitable thickness, which is extended down and beneath the end brake beam 21, and has its upper ends connected to the bracket by any suitable means such as rivets 25.

For the purpose of reinforcing the stirrup or safety support, a diagonal brace bar 26 has its ends riveted to opposite sides of the stirrup as at 27 and 28.

It will be observed that the beam 21 is normally supported above the stirrups, so as to prevent these parts from rubbing during the operation of the brake, but in case one of the hangers 18 should break, the beam will fall until it lands on the stirrup, and the latter will prevent the beam from dropping downwardly on to the track.

Obviously, a side frame might be made with the brackets 22 integral with the ends thereof, and such a construction is within the scope of the present invention.

While I have disclosed the invention in such manner that the construction, operating and advantages thereof may be clearly understood by those skilled in the art, I am aware that various changes may be made in the details illustrated, without departing from the spirit of the invention, as expressed in the claim.

What I claim and desire to secure by Letters Patent is:

In a car truck having a side frame, an angular bracket rigidly attached to one end of the side frame and having an arm projecting inwardly, a transverse end brake beam arranged below said bracket, a U-shaped safety support for the beam arranged substantially parallel to said side frame and having its ends resting on and rigidly united with the bracket, and a diagonal brace bar extending across the safety support and having substantially parallel ends rigidly united with opposite sides of said support.

CLAUDE L. ORR.